United States Patent
Ke et al.

(10) Patent No.: US 8,625,502 B2
(45) Date of Patent: Jan. 7, 2014

(54) METHOD FOR REDUCING INFORMATION LOAD OF PACKET SERVICE CONTROL CHANNEL

(75) Inventors: Yazhu Ke, Shenzhen (CN); Jianwu Dou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 363 days.

(21) Appl. No.: 12/446,573

(22) PCT Filed: Jul. 31, 2007

(86) PCT No.: PCT/CN2007/002311
§ 371 (c)(1),
(2), (4) Date: Jan. 13, 2010

(87) PCT Pub. No.: WO2008/049305
PCT Pub. Date: May 2, 2008

(65) Prior Publication Data
US 2010/0172252 A1     Jul. 8, 2010

(30) Foreign Application Priority Data

Oct. 24, 2006     (CN) .......................... 2006 1 0150739

(51) Int. Cl.
*H04W 4/00*     (2009.01)
*H04L 12/26*     (2006.01)

(52) U.S. Cl.
USPC .......................................... 370/329; 370/252

(58) Field of Classification Search
USPC .................. 370/206, 329, 349, 252, 352, 394
See application file for complete search history.

(56) References Cited

U.S. PATENT DOCUMENTS

| | | | |
|---|---|---|---|
| 7,289,452 B2 * | 10/2007 | Malkamaki | 370/252 |
| 2005/0018656 A1 * | 1/2005 | Rudolf et al. | 370/352 |
| 2006/0034285 A1 * | 2/2006 | Pirskanen et al. | 370/394 |
| 2006/0098567 A1 * | 5/2006 | Willenegger et al. | 370/206 |
| 2007/0014274 A1 * | 1/2007 | Choi | 370/349 |
| 2008/0056229 A1 * | 3/2008 | Gholmieh et al. | 370/349 |
| 2008/0225784 A1 * | 9/2008 | Tseng | 370/329 |

FOREIGN PATENT DOCUMENTS

| | | |
|---|---|---|
| CN | 1628471 A | 6/2005 |
| CN | 1753340 A | 3/2006 |
| CN | 1829130 A | 9/2006 |
| KR | 20030067412 A | 8/2003 |

* cited by examiner

*Primary Examiner* — Mark Rinehart
*Assistant Examiner* — Gbemileke Onamuti
(74) *Attorney, Agent, or Firm* — Bright IP Law Offices

(57) ABSTRACT

The present disclosure provides a method for reducing information load of Packet Service Control Channel and a method for updating channelization code. The method for reducing information load of Packet Service Control Channel comprises the following steps: sending a service access request to a RNC by means of a UE; determining whether the service need to monitor HS-SCCH, and if the HS-SCCH is determined not to be monitored, configuring a transport block size index used when the UE does not need to monitor the HS-SCCH and transmitting the transport block size index to a BS, by means of a RNC; determining a channelization code of a High-Speed Physical Shared Channel according to the transport block size index, and sending the channelization code to the RNC, by means of the BS; transmitting the transport block size index and the channelization code to the UE by means of the RNC.

10 Claims, 3 Drawing Sheets

METHOD FOR REDUCING INFORMATION LOAD OF PACKET SERVICE CONTROL CHANNEL

CROSS-REFERENCE TO RELATED APPLICATION

This application is a national stage filing under 35 U.S.C. 371 of International Application PCT/CN2007/002311, filed on Jul. 31, 2007. International Application Application PCT/CN2007/002311 was published as WO 2008/049305 on May 2, 2008. The entire teachings of the referenced Application are incorporated herein by reference.

BACKGROUND

1. Field

The present disclosure relates to the field of communication, particularly, relates to a method for reducing information load of Packet Service Control Channel and a method for updating channelization code.

2. General Background

With the High-Speed Packet Access System introduced by IP Multimedia Subsystem (IMS), voice can be transmitted in the manner of packet service, which enables the transmission of voice service on a High-Speed Shared Channel. As to the voice service, the valid load sent each time is relatively small because the strong real-time feature thereof. Additionally, a High-Speed Downlink Data Shared Channel needs a High-Speed Shared Control Channel (HS-SCCH for short) to transmit associated signaling information and uses a spread factor of 128. Moreover, the ACK/NACK Control Channel fed back by the uplink also occupies a bandwidth of 256. Compared with the bandwidth occupied by the valid load of voice, the bandwidth occupied by the HS-SCCH and feed back Control Channel thereby accounts for a much higher proportion, which goes against the resource application of the system. To increase the utilization efficiency of resource, for the transmission of voice on a High-Speed Shared Channel, 3GPP standard brings forward that: a HS-SCCH need not to be monitored by a user equipment (UE for short), and a fixed channelization code of a High-Speed Physical Shared Data Channel and a fixed transport block size index used when the UE does not need to monitor the HS-SCCH is designated for such service, so that the UE can receive data on the High-Speed Physical Shared Data Channel without monitoring the HS-SCCH.

To achieve the above function, the combination of a base station (BS for short) with UE is required, to ensure a correct receiving of data by the UE, so as to achieve the purpose of saving resource, that is, the BS must transmit data on a fixed High-Speed achieve Physical Shared Data Channel by a fixed transport block size index used when the UE does not need to monitor the HS-SCCH, and the UE must receive data on a fixed High-Speed Physical Shared Data Channel by a fixed transport block size index used when the UE does not need to monitor the HS-SCCH.

At present, 3GPP protocol can not guarantee that the High-Speed Physical Shared Data Channel and the fixed transport block size index used when the UE does not need to monitor the HS-SCCH of the UE is identical with those of the BS, so that the above function can not be achieved well and the purpose of saving resource can not be achieved.

SUMMARY

In view of the above one or more problems, the present disclosure provides a method for reducing information load of a packet service control channel and a method for updating channelization code, wherein the High-Speed Physical Shared Data Channel and the transport block size used when the UE does not need to monitor the HS-SCCH are configured by a radio network controller (RNC for short) and a BS, to ensure that the High-Speed Physical Shared Data Channel and the fixed transport block size index used when the UE does not need to monitor the HS-SCCH of the UE is identical with those of the BS, so that the purpose of saving resource can be achieved.

The method for reducing information load of packet service control channel comprises the following steps:

Step 102, sending a service access request to a RNC by means of a UE;

Step 104, determining whether the service need to monitor HS-SCCH, and if the HS-SCCH is determined not to be monitored, configuring a transport block size index used when the UE does not need to monitor the HS-SCCH and transmitting the transport block size index to a BS, by means of a RNC;

Step 106, determining a channelization code of a High-Speed Physical Shared Channel according to the transport block size index, and sending the channelization code to the RNC, by means of the BS;

Step 108, transmitting the transport block size index and the channelization code to the UE by means of the RNC.

Preferably, the RNC transmits the channelization code of the High-Speed Physical Shared Data Channel to the BS when the BS is the one of a service cell of High-Speed Downlink Packet Service.

Preferably, in the case of establishing a new radio link, the RNC transmits the transport block size index and/or the channelization code to the BS via a radio link establishing request message, and the BS transmits the determined channelization code to the RNC via a radio link establishing response message.

Preferably, when the transport block size index and/or the channelization code need to be updated, the RNC transmits the transport block size index and/or the channelization code to the BS via radio link synchronous reconfiguration or radio link asynchronous reconfiguration, and the BS feeds back a new channelization code to the RNC.

Preferably, when a radio link needs to be added for the UE and the added radio link is a service cell of High-Speed Downlink Packet Service, the RNC transmits the transport block size index and/or the channelization code to the BS via a radio link adding message, and the BS feeds back the determined channelization code to the RNC via a radio link adding response message.

Preferably, the transport block size index configured by the RNC is associated with MAC-D stream, and the BS sends data directly in the case of transmitting MAC-D stream, without transmitting signaling information, the transport block size index and/or the channelization code.

Preferably, the transport block size index configured by the RNC is not associated with MAC-D stream, the BS needs to determine the time to transmit signaling information, the transport block size index and/or the channelization code, for sending data.

Preferably, the RNC configures at least one transport block size index and/or at least one channelization code.

Preferably, the BS feeds back at least one channelization code.

Preferably, when the channelization code needs to be updated, the BS transmits change indication information of the channelization code to the RNC via a wireless interface parameter message, and when the change indication information of the channelization code is received, the RNC can originate a reconfiguration process to the BS.

By configuring the High-Speed Physical Shared Data Channel and the transport block size index used when the UE does not need to monitor the HS-SCCH, the present disclosure enables the UE to receive data on a fixed High-Speed Physical Shared Data Channel by a fixed transport block size, so data can be correctly received and the purpose of saving resource can be achieved.

DESCRIPTION OF THE DRAWINGS

The figures illustrated here provide a further understanding to the present disclosure and constitute a part of the present application. The schematic embodiments and explanations thereof serve to explain the present disclosure and are not intended to restrict it. In the figures.

DETAILED DESCRIPTION

The embodiments of the present disclosure will be illustrated in combination with the accompanying drawings in details as follows, and if not conflict, the embodiments and the technical features of the embodiments can be combined:

The object of the present disclosure lies in providing a method for reducing information load of Packet Service Control Channel, wherein the RNC controls the transport block size used by the BS when the UE does not need to monitor the HS-SCCH, or the RNC controls the transport block size used by the BS when the UE does not need to monitor the HS-SCCH and the channelization code of the High-Speed Physical Shared Data Channel available for the transport block size; the BS controls the High-Speed Physical Shared Data Channel available for the transport block size and feeds it back to the RNC, and the RNC informs the UE. The UE can thereby receive data on a fixed High-Speed Physical Shared Data Channel by a fixed transport block size, to ensure a correct receiving of data by the UE and achieve the purpose of saving resource.

Figure 1:
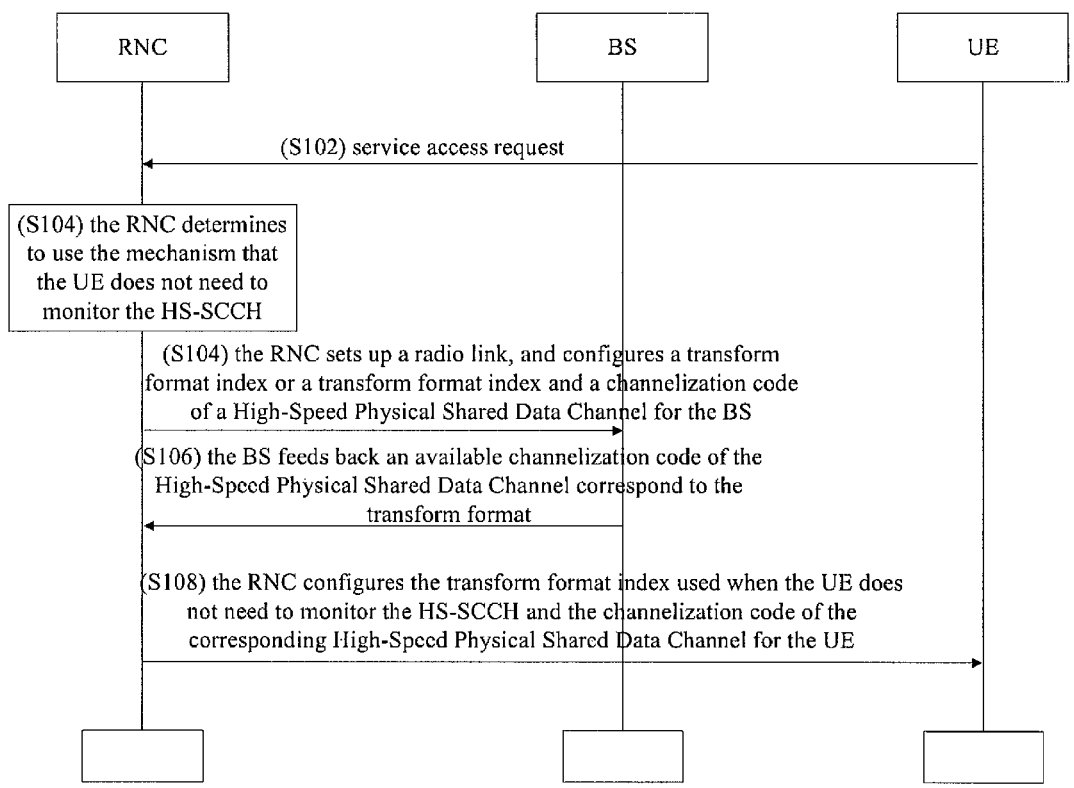
FIG. 1 is a flow chart illustrating the method for reducing information load of HS-SCCH according to embodiments of the present disclosure.

FIG. 1 is a flow chart of the method for reducing information load of HS-SCCH according to the embodiments of the present disclosure. As shown in FIG. 1, the method comprises the following steps:

Step 102, UE sends a service access request to RNC;

Step 104, the RNC determines the service needs to use the mechanism that the UE does not need to monitor the HS-SCCH, and the RNC only configures the transport block size index used when the UE does not need to monitor the HS-SCCH for the BS, or, the RNC configures the transport block size index used when the UE does not need to monitor the HS-SCCH and the channelization code of the High-Speed Physical Shared Data Channel used by the transport block size;

Step 106, the BS determines the channelization code of the High-Speed Physical Shared Data Channel used by the transport block size; and Step 108, the RNC informs the UE of the transport block size index used when the UE does not need to monitor the HS-SCCH and the channelization code of the High-Speed Physical Shared Data Channel used by the transport block size. Then, the UE can receive data on a fixed High-Speed Physical Shared Data Channel by a fixed transport block size, which can ensure the correct receiving of data while save resource.

Preferably, in Step 108, the RNC only needs to inform the transport block size index used when the UE does not need to monitor the HS-SCCH to the UE of service cell of High-Speed Downlink Packet Service, or the RNC only needs to inform the transport block size index used when the UE does not need to monitor the HS-SCCH and the channelization code of the High-Speed Physical Shared Data Channel used by the transport block size to the UE of service cell of High-Speed Downlink Packet Service.

Preferably, only BS of a service cell of High-Speed Downlink Packet Service needs to feed back channelization code information of High-Speed Physical Shared Data Channel.

Preferably, if a new radio link is established, then the RNC configures the following for the BS in a radio link establishing request message in Step 104: (1) the transport block size index used when the UE does not need to monitor the HS-SCCH, or (2) the transport block size index used when the UE does not need to monitor the HS-SCCH and the channelization code of the High-Speed Physical Shared Data Channel used by the transform size; and the BS configures channelization code information of the High-Speed Physical Shared Data Channel in a radio link establishing response message.

Preferably, if the RNC needs to update the transport block size index used when the UE does not need to monitor the HS-SCCH and/or the channelization code of the High-Speed Physical Shared Data Channel, the BS is informed of the updated transport block size index used when the UE does not need to monitor the HS-SCCH and/or the channelization code of the High-Speed Physical Shared Data Channel via a radio link synchronous reconfiguration or radio link asynchronous reconfiguration, the BS can feed back the new channelization code of the High-Speed Physical Shared Data Channel used by the transport block size index or not; if no feedback is conducted, it indicates the new channelization code of the High-Speed Physical Shared Data Channel is not changed.

Preferably, if the RNC needs to add a radio link for the UE and the added link is a service cell of High-Speed Downlink Packet Service, then the BS is informed of the following via a radio link adding message: (1) the transport block size index used when the UE does not need to monitor HS-SCCH, or (2) the transport block size index used when the UE does not need to monitor HS-SCCH and the channelization code of the High-Speed Physical Shared Data Channel used by the transport block size; the BS then feeds back the channelization code information of the High-Speed Physical Shared Data Channel to the RNC in a radio link adding response message.

Preferably, the transport block size index mentioned above can either be associated with Mac-d stream or not.

Preferably, if the transport block size index used when the UE does not need to monitor the HS-SCCH is associated with Mac-d stream, it is not need to send signaling information on the HS-SCCH for the BS only when the Mac-d stream data is sent, and the transport block size index used when the UE does not need to monitor the HS-SCCH and the channelization code of the corresponding High-Speed Physical Shared Data Channel are used to send data by the BS.

Preferably, if the transport block size index used when the UE does not need to monitor the HS-SCCH and the channelization code of the High-Speed Physical Shared Data Channel are not associated with Mac-d stream, the BS determines when it is not need to send signaling information on the HS-SCCH, and sends data using the transport block size index used when the UE does not need to monitor the HS-SCCH and the channelization code of the corresponding High-Speed Physical Shared Data Channel.

Preferably, the transport block size index configured by the RNC can be one or more.

Preferably, the channelization code of the High-Speed Physical Shared Data Channel configured by the RNC can be one or more.

Further, the channelization code of the High-Speed Physical Shared Data Channel fed back by the BS can be one or more.

The method of the present disclosure is carried out on the basis of the existing 3GPP protocol standard by adding: (1) the transport block size index used when the UE does not need to monitor the HS-SCCH, or (2) the channelization code of the High-Speed Physical Shared Data Channel and the transport block size index used when the UE does not need to monitor the HS-SCCH, in the radio link establishing request or radio link adding request or radio link reconfiguration message, wherein the BS feeds back the channelization code information of the High-Speed Physical Shared Data Channel in the radio link establishing response or radio link adding response or radio link reconfiguration response message.

Figure 2:
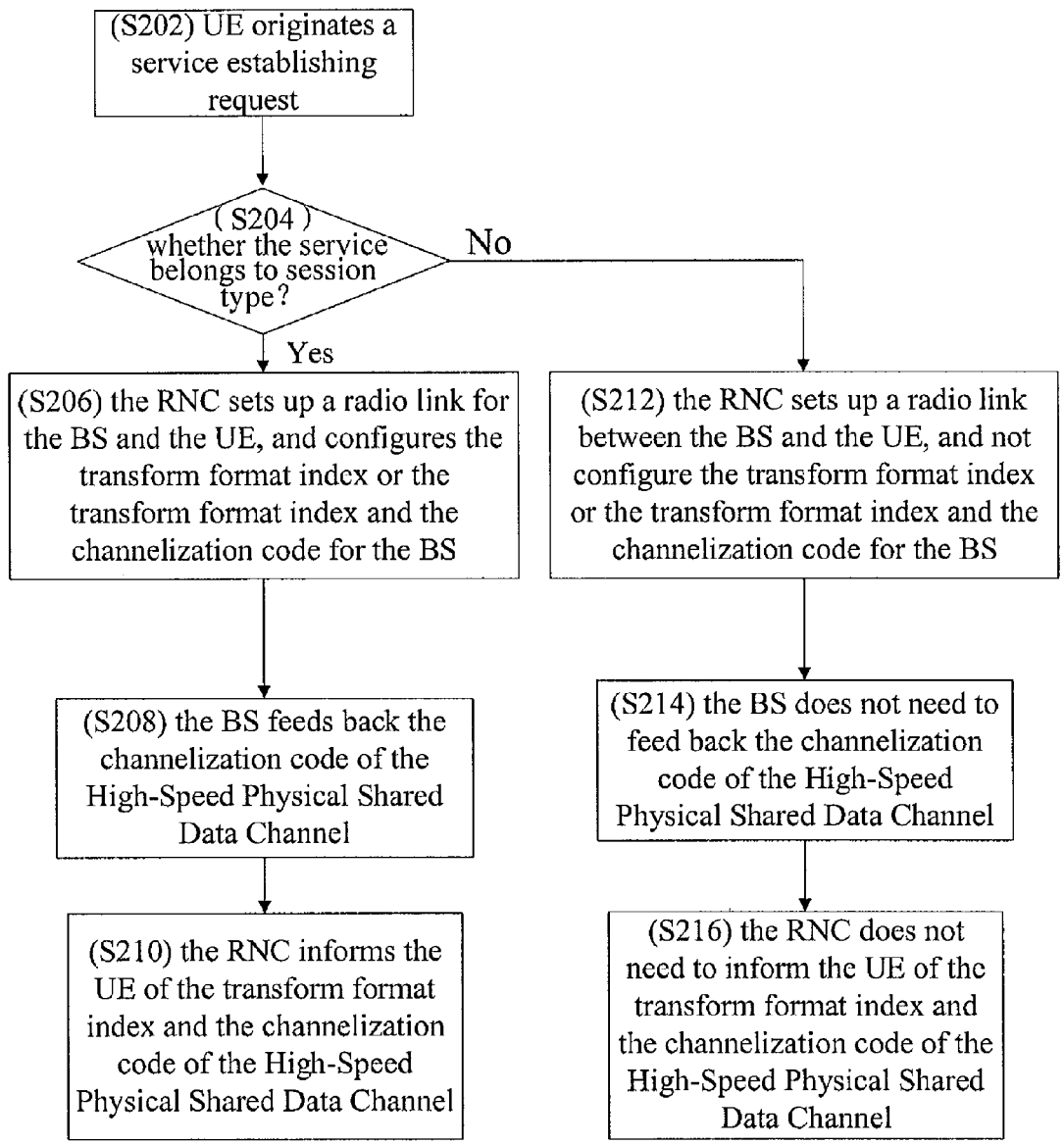
FIG. 2 is a detailed flow chart illustrating the method for reducing information load of HS-SCCH according to the embodiments of the present disclosure.

As shown in FIG. 2, there provides a method for configuring the High-Speed Physical Shared Data Channel and the transport block size index used when the UE does not need to monitor the HS-SCCH when the RNC sets up a radio link between the UE and the BS, comprising the following steps:

Step 202, UE originates a service request;

Step 204, the RNC judges the access service type originated by the user, if it belongs to session type, then proceeds to Step 206, otherwise, proceeds to Step 212;

Step 206, the RNC sets up a radio link between the BS and the UE, and configures (1) the transport block size index used when the UE does not need to monitor the HS-SCCH, or (2) the transport block size index used when the UE does not need to monitor the HS-SCCH and the channelization code of the High-Speed Physical Shared Data Channel used by the transport block size, in the radio link establishing request message, then proceeds to Step 208;

Step 208, the BS feeds back the channelization code of the High-Speed Physical Shared Data Channel in the radio link establishing request response message, then proceeds to Step 210;

Step 210, the RNC informs the UE of the transport block size index used when the UE does not need to monitor the HS-SCCH and the channelization code of the High-Speed Physical Shared Data Channel;

Step 212, the RNC sets up a radio link between the BS and the UE, and does not need to configure the transport block size index used when the UE does not need to monitor the HS-SCCH in the radio link establishing request message, then proceeds to Step 214;

Step 214, the BS does not feed back the channelization code of the High-Speed Physical Shared Data Channel in the radio link establishing request response message, then proceeds to Step 216;

Step 216, the RNC does not need to inform the UE of the transport block size index used when the UE does not need to monitor the HS-SCCH and the channelization code of the High-Speed Physical Shared Data Channel.

Figure 3:
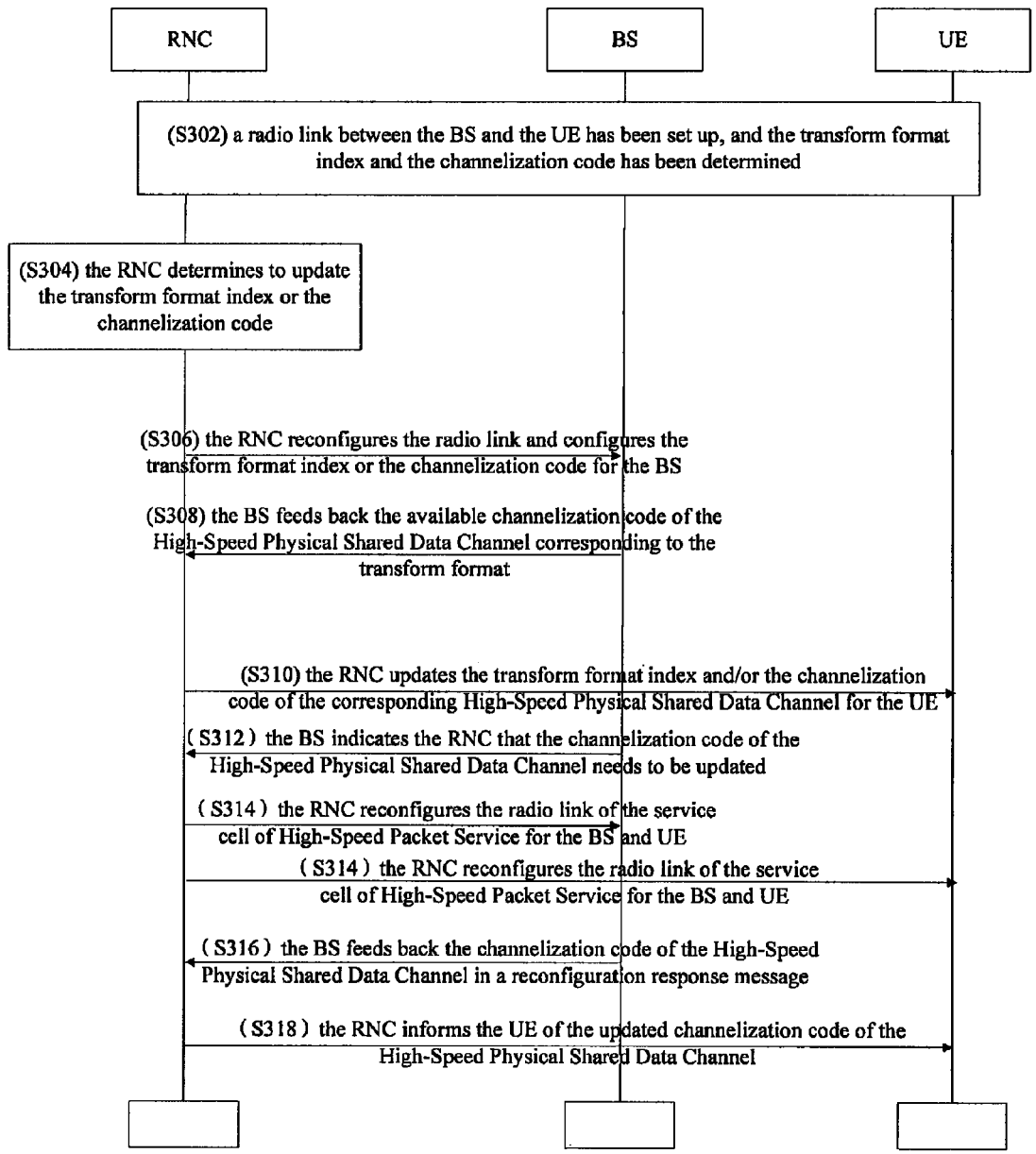
FIG. 3 schematically shows the method for reconfiguring the transport block size index and channelization code according to the embodiments of the present disclosure.

As shown in FIG. 3, there provides a method for reconfiguring the transport block size index used when the UE does not need to monitor the HS-SCCH and the channelization code of the High-Speed Physical Shared Data Channel, comprising the following steps:

Step 302, the RNC has set up a radio link for the BS and the UE, and configured for the BS the transport block size index used when the UE does not need to monitor the HS-SCCH, and the channelization code of the High-Speed Physical Shared Data Channel fed back by the BS;

Step 304, the RNC monitors that the transport block size index used when the UE does not need to monitor the HS-SCCH or the channelization code of the High-Speed Physical Shared Data Channel used by the transport block size need to be updated;

Step 306, the RNC reconfigures a radio link of a service cell of high speed packet service, and updates the transport block size index used when the UE does not need to monitor the HS-SCCH or the channelization code of the High-Speed Physical Shared Data Channel used by the transport block size;

Step 308, the BS feeds back the channelization code of the High-Speed Physical Shared Data Channel in a reconfiguration response message;

Step 310, the RNC informs the UE of the transport block size index used when the UE does not need to monitor the HS-SCCH and/or the channelization code of the High-Speed Physical Shared Data Channel;

Step 312, the BS indicates the RNC that the channelization code of the High-Speed Physical Shared Data Channel needs to be updated;

Step 314, the RNC reconfigures the radio link of the service cell of High-Speed Packet Service for the BS and UE;

Step 316, the BS feeds back the channelization code of the High-Speed Physical Shared Data Channel in the reconfiguration response message;

Step 318, the RNC informs the UE of the updated channelization code of the High-Speed Physical Shared Data Channel.

To sum up, the present disclosure enables the UE to receive data on a fixed High-Speed Physical Shared Data Channel by a fixed transport block size, to ensure a correct receiving of data by the UE and achieve the purpose of saving resource.

According to the embodiment of the present disclosure, computer program product for configuring the High-Speed Physical Shared Data Channel and the transport block size index used when the UE does not need to monitor the HS-SCCH is also provided. The computer program product comprises instructions for causing a processor to perform the steps shown in any one of FIG. 1-3. For the person skilled in the art, it is easy to be achieved by referring to the embodiments and the figures described above, so details will be omitted.

The present disclosure has been shown with reference to the above-described embodiments, and it is not to be limited by the above embodiments. It is understood by those skilled in the art various alterations and changes may be made within the spirit and scope of the disclosure. All modifications, substitute equivalents or improvements made therein are intended to be embraced in the claims of this disclosure.

The invention claimed is:

1. A method for reducing information load of Packet Service Control Channel, comprising the following steps:
   a user equipment sending a service access request to a radio network controller;
   the radio network controller determining whether the service needs to monitor a High-Speed Shared Control Channel;
   after the High-Speed Shared Control Channel is determined not to require to be monitored, the radio network controller configuring a transport block size index used when the user equipment does not need to monitor the High-Speed Shared Control Channel and transmitting the transport block size index to a base station;

the base station determining a channelization code of a High-Speed Physical Downlink Shared Channel according to the transport block size index, and sending the channelization code to the radio network controller; and the radio network controller transmitting the transport block size index and the channelization code to the user equipment.

2. The method according, to claim 1, comprising the radio network controller transmitting the channelization code of the High-Speed Physical Shared Channel to the base station when the base station is the one of a service cell of High-Speed Downlink Packet Service.

3. The method according to claim 1, comprising in the case of establishing a new radio link, the radio network controller transmitting the transport block size index and/or the channelization code to the base station via a radio link establishing request message, and the base station sending a determined channelization code to the radio network controller via a radio link establishing response message.

4. The method according to claim 1, comprising when the transport block size index and/or the channelization code need to be updated, the radio network controller transmitting, the transport block size index and/or the channelization code to the base station via radio link synchronous reconfiguration or radio link asynchronous reconfiguration, and the base station returning a new channelization code to the radio network controller.

5. The method according to claim 1, comprising when a radio link needs to be added for the user equipment and the added radio link is a service cell of High-Speed Downlink Packet Service, the radio network controller sending the transport block size index and/or the channelization code to the base station via a radio link adding message, and the base station returning a determined channelization code to the RNC via a radio link adding response message.

6. The method according to claim 1, comprising when the transport block size index configured by the radio network controller is associated with a Mac-d stream, the base station directly transmitting data in the case of sending the Mac-d stream, without transmitting signaling information, the transport block size index and/or the channelization code.

7. The method according to claim 1, comprising when the transport block size index configured by the radio network controller is not associated with a Mac-d stream, the base station determining time to transmit signaling information, the transport block size index and/or the channelization code for transmitting data.

8. The method according to anyone of claims 1-3, comprising the radio network controller configuring at least one transport block size index and/or at least one channelization code.

9. The method according to anyone of claims 1-3, comprising the base station returning at least one channelization code to the radio network controller.

10. The method according to anyone of claims 1-3, comprising when the channelization code needs to be updated, the base station transmitting change indication information of the channelization code to the radio network controller via a wireless interface parameter message, and after receiving the change indication information of the channelization code, the radio network controller initiating a reconfiguration process to the base station.

* * * * *